United States Patent [19]

Payne

[11] Patent Number: 5,145,282
[45] Date of Patent: Sep. 8, 1992

[54] CONTINUOUS TUBULAR STRUCTURE FORMING AND PLACING APPARATUS AND METHOD

[76] Inventor: LeRoy Payne, 3300 Nicholas La., Molt, Mont. 59057

[21] Appl. No.: 753,344

[22] Filed: Aug. 30, 1991

Related U.S. Application Data

[63] Continuation-in-part of Ser. No. 521,442, May 10, 1990, Pat. No. 5,049,006, which is a continuation-in-part of Ser. No. 417,501, Oct. 5, 1989, Pat. No. 4,955,760, which is a continuation-in-part of Ser. No. 235,205, Aug. 23, 1988, Pat. No. 4,872,784.

[51] Int. Cl.⁵ .............................................. F16L 1/00
[52] U.S. Cl. ................................ 405/155; 156/287; 156/547; 405/150; 405/154
[58] Field of Search ............... 405/155, 154, 157, 146, 405/150, 270; 138/97; 156/550, 547, 287, 294

[56] References Cited

U.S. PATENT DOCUMENTS

| | | | |
|---|---|---|---|
| 1,882,715 | 10/1932 | Angier | 156/550 X |
| 2,983,636 | 5/1961 | Runton | 156/550 X |
| 3,250,654 | 5/1966 | Rubenstein | 405/155 X |
| 3,432,378 | 3/1969 | Huss | 156/499 X |
| 3,511,729 | 5/1970 | Williams | 156/550 X |
| 3,576,696 | 4/1971 | Normanton | 156/547 |
| 3,813,313 | 5/1974 | Feucht et al. | 156/287 |
| 4,071,384 | 1/1978 | Eigenmann | 156/499 X |
| 4,417,939 | 11/1983 | McAdams | 156/547 X |
| 4,581,247 | 4/1986 | Wood | 156/287 X |
| 4,681,783 | 7/1987 | Hyodo et al. | 156/287 X |
| 4,828,432 | 5/1989 | Ives | 405/270 |

FOREIGN PATENT DOCUMENTS

| | | | |
|---|---|---|---|
| 1370244 | 10/1974 | United Kingdom | 405/155 |
| 1451942 | 10/1976 | United Kingdom | 405/155 |

*Primary Examiner*—Dennis L. Taylor
*Attorney, Agent, or Firm*—Arthur L. Urban

[57] ABSTRACT

Mobile continuous tubular structure forming and placing apparatus includes a support portion, a row material supplying portion, a matrix forming portion, a tubular structure forming portion and a control portion. The raw material supplying portion includes a plurality of reservoirs connected independently with the matrix forming portion through conduits. The tubular structure forming portion includes a frame section and an arcuate blanket support associated with the frame section. A blanket transport is disposed adjacent the arcuate blanket support and aligned therewith, the blanket transport being movable from one end of the arcuate blanket support to an opposite end thereof. A plurality of spaced movable finger members are disposed along each longitudinal edge of the arcuate blanket support with interconnectors joining adjacent finger members. The control portion includes blanket advancing mechanism, finger moving mechanism and a coordinator for the blanket advance, mixture delivery and finger movement in a preselected sequence to form a continuous tubular structure. Also, a method of forming and placing a continuous tubular structure and the resulting tubular structure.

30 Claims, 1 Drawing Sheet

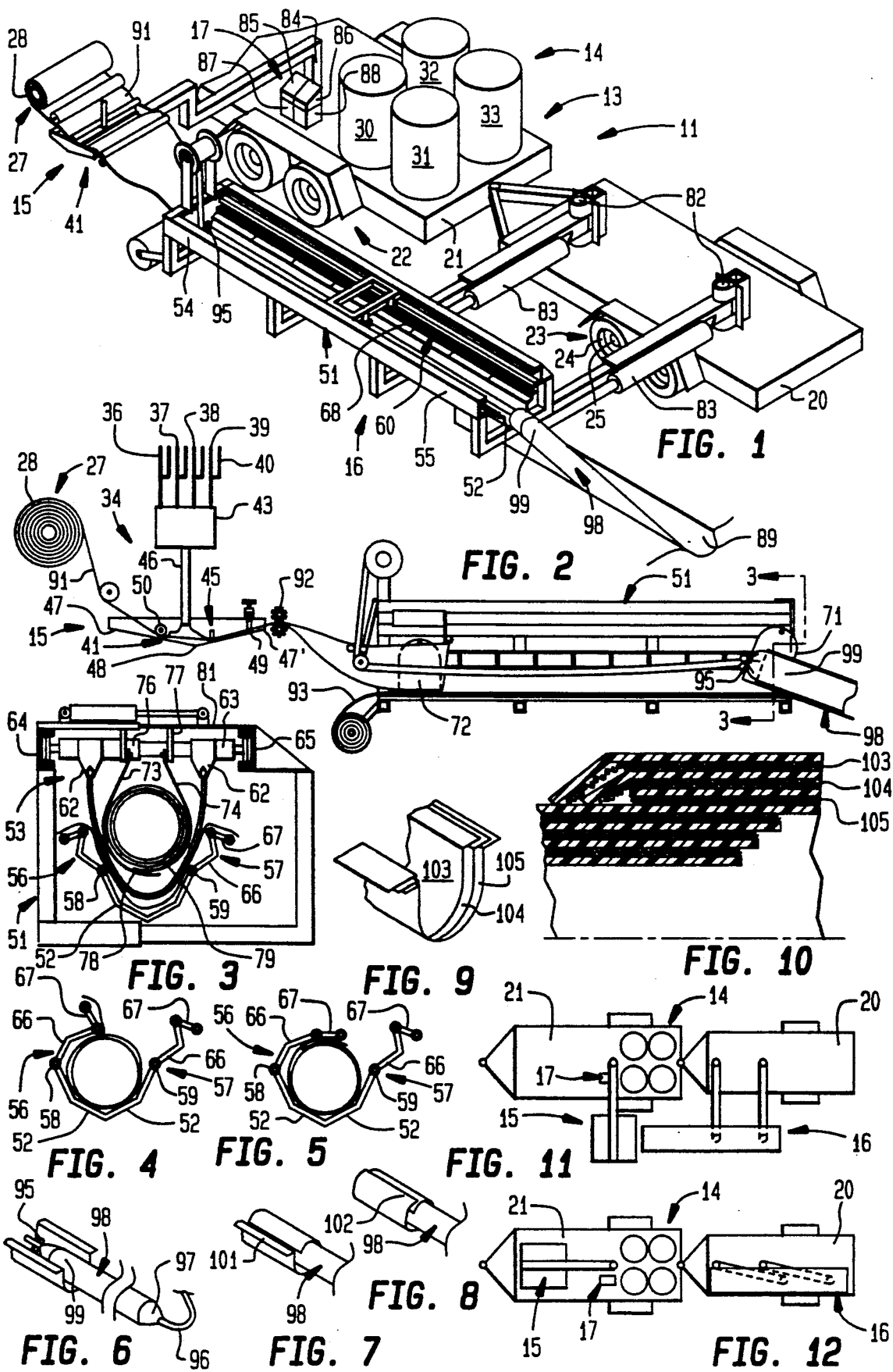

CONTINUOUS TUBULAR STRUCTURE FORMING AND PLACING APPARATUS AND METHOD

This application is a continuation-in-part of pending application Ser. No. 521,442, filed May 10, 1990 now U.S. Pat. No. 5,049,006, which in turn is a continuation-in-part of application Ser. No. 417,501, filed Oct. 5, 1989, now U.S. Pat. No. 4,955,760, which in turn is a continuation-in-part of application Ser. No. 235,205, filed Aug. 23, 1988, now U.S. Pat. No. 4,872,784.

This invention relates to a novel mobile tubular structure forming and placing apparatus and method and to a new continuous tubular structure produced thereby.

In recent years, the management of natural resources has become important in many countries throughout the world. Efforts have been directed both toward the conservation of our resources and toward the elimination of pollution from our environment. Particular emphasis has been placed on waste leakage and water loss.

For example, losses in the transfer of water using unlined ditches are estimated at a minimum to be 25% and in some situations to be more than 50% depending upon the porosity of the ditch surface and the distance the water is being moved. In most rural areas, ditches are formed by excavating the soil to the desired depth and width. The water moves through the ditch in contact with the exposed natural surface. This can be sand, clay, rocks, etc. and more commonly mixtures thereof. The porosity will depend upon the proportions of the different components.

While such ditches have been used in the past, the results were considered acceptable only because the supply of water exceeded the needs. However, as civilization developed and world population increased, more water was required both for greater food production and for the marked increase in non-agricultural uses. In addition to greater domestic uses in sanitation, industry now employs large quantities of water in manufacturing and processing procedures.

This high level of consumption plus the very high cost of developing new water supplies has shifted attention to water conservation. Domestic applicances that use less water have been developed. Also, industry has installed recycling purification systems to reduce water consumption.

Although conservation efforts have reduced water consumption to a degree, water still is in relatively short supply, particularly in recent years with the severe droughts in the United States and other countries. Since the most cost effective conservation opportunities and most readily accessible water supplies already have been developed, greater attention must be directed to improving the efficiency of water distribution systems.

Some improvements in water distribution already have been made. A limited number of ditches, canals and similar structures have been formed with placed concrete and/or preformed concrete units such as pipe. Concrete is durable and has a long life when properly used. However, concrete is expensive to place and finish and is damaged by depressed temperatures during curing. Also, concrete is subject to frost damage, cracking and heaving which results in leaks.

PVC (polyvinylchloride) liner and pipe also have been used to some extent in water distribution systems. PVC is less costly than concrete. The limited durability of PVC can be improved to a degree by burying it under several feet of soil. The soil holds the structure in place and cushions it against damage. However, both with concrete and PVC, considerable site preparation is required and after placement extra grading and filling frequently are needed to finish the job.

From the above discussion, it is clear that neither concrete nor PVC provides the desired characteristics for successful liquid distribution and storage, that is, durability, low cost and easy placement. Thus, there is a need for a new structure and particularly a tubular structure that provides these requirements.

The present invention provides a novel mobile continuous tubular structure forming and placing apparatus and method which overcome the deficiencies of previous expedients. The invention not only overcomes those shortcomings, but also provides features and advantages not found in previous technology. The apparatus and method of the invention produce a uniform quality tubular structure continuously and quickly. The tubular structure of the invention is formed and placed with little hand labor. With the apparatus and method of the invention, the configuration and composition of the tubular structure can be modified along its length as desired automatically to provide special configurations for spillways, headgates, changes in direction and the like.

Mobile apparatus for forming and placing the novel tubular structure according to the method of the present invention is simple in design and can be produced relatively inexpensively. Commercially available materials and components can be utilized with conventional fabricating procedures in the manufacture of the apparatus. Semiskilled workmen can operate the apparatus efficiently after a minimum of instruction. The apparatus is durable in construction and has a long useful life with little maintenance.

The apparatus and method of the invention can be modified to form a variety of different tubular structures. Variations in physical dimensions, composition and surface appearance, etc. can be achieved quickly. Even with such variations, uniform quality is maintained without difficulty.

These and other benefits and advantages of the novel apparatus, method and tubular structure of the present invention will be apparent from the following description and the accompanying drawings in which:

FIG. 1 is a view in perspective of one form of continuous tubular structure forming and placing apparatus of the invention;

FIG. 2 is a side view partially in section of the structure forming portion of the apparatus shown in FIG. 1 during the formation of a continuous tubular structure of the invention;

FIG. 3 is a sectional end view of the structure forming portion shown in FIG. 2 taken along line 3—3 thereof;

FIG. 4 is a fragmentary schematic illustration of the structure forming portion shown in FIG. 3 during the formation of a continuous tubular structure of the invention;

FIG. 5 is a fragmentary schematic illustration of the structure forming portion shown in FIG. 4 during a succeeding step in the formation of a continuous tubular structure of the invention;

FIG. 6 is a fragmentary schematic illustration in perspective of a continuous tubular structure of the invention during the formation thereof;

FIG. 7 is a fragmentary schematic illustration in perspective of the tubular structure shown in FIG. 6 during a further step in the formation thereof;

FIG. 8 is a fragmentary schematic illustration in perspective of the tubular structure shown in FIG. 7 during a subsequent step in the formation thereof;

FIG. 9 is a fragmentary schematic illustration in perspective of an end of a stack of blankets during the formation of a continuous structure of the invention;

FIG. 10 is a sectional view of an overlap area between adjoining sections of a continuous tubular structure of the invention;

FIG. 11 is a schematic illustration from above of the apparatus shown in FIG. 1 in an operating position; and FIG. 12 is a schematic illustration from above of the apparatus shown in FIG. 1 in a stored position.

As shown in the drawings, one form of mobile continuous tubular structure forming and placing apparatus 11 of the present invention includes a support portion 13, a raw material supplying portion 14, a matrix forming portion 15, a tubular structure forming portion 16 and a control portion 17.

The support portion 13 of the tubular structure forming and placing apparatus 11 of the invention includes a base section 21. The base section includes carriage means 22 depending therefrom. The carriage means as shown includes an axle assembly 23 with wheels 24 mounted on free ends of axle 25. Advantageously, the support portion 13 includes more than one base section shown as base sections 20 and 21 which preferably are selectively connectable.

The support portion also advantageously includes blanket support means 27 which preferably extends from base section 21. The blanket support means advantageously accommodates a significant length of one or more continuous porous blankets on rolls 28 in a dispensing orientation.

The raw material supplying portion 14 includes a plurality of reservoirs 30, 31, 32 and 33 as required. The reservoirs may include resin forming components, catalysts, fillers, particulate reinforcements, other additives and the like. The reservoirs are connected independently with mixing means 34 of matrix forming portion 15 through conduit means 36, 37, 38 and 39. An independent bypass return conduit 40 preferably extends from an end of each conduit 36–39 adjacent mixing means 34 back to the respective reservoir.

In addition to the raw material mixing means 34, the matrix forming portion 15 of the apparatus 11 includes mixture applying means 41. The mixing means 34 advantageously is of the flow through type including an elongated chamber 43 with agitating means such as fixed or movable deflector surfaces (not shown).

The mixture applying means 41 of the matrix forming portion 15 preferably is disposed adjacent mixing means 34. The mixture applying means advantageously includes a table section 45 disposed in a generally horizontal orientation below a transversely reciprocating nozzle 46. The table section preferably includes major surfaces shown as surfaces 47 and 47' at a slight angle to one another forming at least one shallow depression 48 which most preferably is disposed transversely to the movement of a blanket thereover. Advantageously, one or more wiper blades 49 are adjustably disposed transversely adjacent the exit end of the table section 45. In addition, a hold down roller 50 may be positioned adjacent the entry end of the table.

The tubular structure forming portion 16 of the apparatus 11 includes a frame section 51 with arcuate blanket support means 52 associated therewith. Blanket transporting means 53 is disposed adjacent the blanket support means 52 and is aligned therewith. The blanket transporting means is movable from one end 54 of the arcuate blanket support to an opposite end 55 thereof.

A plurality of spaced finger members 56 and 57 are disposed along each longitudinal edge 58 and 59 of the arcuate blanket support 52. Interconnecting means 60 joins adjacent finger members.

The blanket transporting means 53 advantageously includes blanket end engaging means 62 and preferably includes at least two spaced end engaging means mounted on transverse carrier means 63. The transverse carrier advantageously is supported between spaced parallel longitudinal track members 64 and 65 of the frame section 51.

The movable finger members 56 and 57 of structure forming portion 16 preferably are pivotally connected to the arcuate blanket support 52. Advantageously, the movable finger members include sections 66 and 67 that are pivotally connected along the length of each finger member.

The finger members preferably are interconnected to provide simultaneous movement of all finger members 56 or 57 that are disposed along one edge 58 or 59 respectively of the arcuate blanket support 52. In addition, the finger members along one edge advantageously are interconnected to provide simultaneous movement of the corresponding finger sections 66 or 67 of adjacent finger members. Preferably, a continuous expanded metal section 68 or the like may be utilized to interconnect corresponding sections along one edge.

The structure forming portion 16 advantageously also includes support assemblies 71 and 72 disposed adjacent each end of the blanket support 52. The support assemblies preferably include cooperating arcuate sections 73 and 74 which are movably suspended from side members 76 and 77 of the frame section 51. The lower ends 78 and 79 of the cooperating arcuate sections 73 and 74 normally overlap but separate periodically as required in the advance of the continuous tubular structure through the structure forming portion 16 as will be described hereinafter.

To facilitate the formation of different sizes of tubular structures, frame section 51 of structure forming portion 16 may include cross members 81 and a carrier 63 which telescope so they may be shortened or lengthened as required to accommodate different size arcuate blanket supports 52. Alternatively, the arcuate support 52 may be constructed with adjustable sections (not shown).

The tubular structure forming portion 16 advantageously is orientable with respect to the support portion 13 and most preferably is orientable to a position substantially parallel to a base section. Also, the matrix forming portion 15 preferably is orientable with respect to base section 21 and with respect to the structure forming portion 16.

Advantageously, as shown in the drawings, the tubular structure forming portion 16 of the apparatus 11 of the invention is disposed on a separate base section 20 which preferably includes wheeled carriage means 22. The structure forming portion 16 advantageously is pivotally connected to base section 20 through upstanding supports 82 and pistons 83 so the structure forming portion can be swung from an operating position as shown in FIG. 11 to a stored or traveling position in FIG. 12.

In the same way, the matrix forming portion 15 carried on base section 21 can be pivoted on upstanding support 84 from an operating position in FIG. 11 that is aligned with the structure forming portion to a stored position as shown in FIG. 12. The matrix forming portion 15 advantageously may be carried on base section 21 with the raw material supplying portion 14 and the control portion 17.

The control portion 17 of the mobile continuous tubular structure forming and placing apparatus 11 of the invention includes blanket advancing means 85, finger moving means 86 and coordinating means 87. The means 87 coordinates the blankets advance, mixture delivery and the finger movement in a preselected sequence to form a continuous tubular structure.

The control portion advantageously includes a plurality of pumps, valves, monitors, drives and the like (not shown). Preferably, a pump, a valve, and a flow monitor are located along the length of each conduit 36-39 that extends between the raw material reservoirs 30-33 and the mixing chamber 43. Drivers activate the blanket advancing means 85 and the finger moving means 86.

Preferably, the control portion 17 includes programmable memory means 88 which enables the coordinating means 87 to automatically control the operation of the apparatus 11. The coordinating means advantageously includes a process controller that initiates changes in the flows of materials and speeds of drives to bring variations therein back to the rates specified in the programs present in the memory 88.

This coordination commonly is achieved through the transmission of information such as digital pulses from the monitors and/or sensors at the control components to the process controller. The operating information is compared with the preselected programming parameters stored in the memory 88. If differences are detected, instructions from the controller change the operation of the components to restore the various operations to the preselected processing specifications.

The apparatus 11 of the present invention described above and shown in the drawings is used to form a novel continuous tubular structure employing the forming and placing method of the invention.

The specifications of the continuous tubular structure first are established. Thereafter, the control portion 17 including memory 88 which may be a computer, is programmed with the necessary processing parameters to form the desired tubular structure and to achieve the proper placement thereof. Also, the particular blanket materials and the raw materials required to produce the desired matrix therein are selected.

Suitable porous blankets include woven, knit, nonwoven structures, etc. The blankets e.g. fabrics, mats, etc. may be formed of continuous or discontinuous fibers, yarns, slit ribbons and similar natural and synthetic fibrous materials. Reinforcing members such as ropes, cables and the like that extend longitudinally and/or transversely of the blanket centerline may be included if desired.

The solidifiable liquid mixture applied to the blanket in the method of the invention advantageously includes a resin forming mixture and preferably is a thermosetting resin forming mixture such as a polyester or polyurethane forming mixture. The mixtures also may include catalysts, fillers, particulate reinforcements and the like.

The apparatus 11 is moved to a location at which the continuous tubular structure is to be formed and placed. The apparatus is generally aligned alongside a previously excavated trench 89 into which the structure is to be placed. Buttons and/or switches (not shown) are depressed to activate the memory 88 and the other components of the control portion 17. The coordinating means 87 energizes pistons 83 to swing the matrix forming portion 15 and the structure forming portion 16 into an operating position in which the portions are aligned over the trench.

Thereafter, pumps, valves and flow monitors (not shown) are energized by the coordinating means 87 in preselected sequences of the program stored in the memory 88. This causes the raw materials in reservoirs 30-33 to advance along the conduits 36-39 toward the mixing chamber 43. For example, to provide a polyurethane resin matrix, reservoir 30 may contain an isocyanate, reservoir 31 a polyol, 32 a filler, and 33 colors or catalysts, etc. as required.

For the production of a high quality tubular structure of the invention, it is important that the raw materials delivered to the mixing chamber 43 be uniform in volume and composition. This can be facilitated by providing a continuous flow of raw materials to the mixing chamber and the immediate transfer of the mixture therefrom to the mixture applying means 41.

Advantageously, separate bypass return conduit 40 is utilized from the end of each conduit 36-39 at a point adjacent the mixing chamber 43 back to respective reservoir 30-33. This construction provides a freshly formed uniform mixture to the mixture applicator even though the distance is considerable between the reservoirs and the mixing chamber which is located closely adjacent to the applicator.

As shown in FIG. 2 of the drawings, the freshly formed mixture delivered to the mixture applicator passes through transversely reciprocating nozzle 46 which is positioned above table section 45 over which a porous flexible blanket 91 is advancing. A preselected quantity of the mixture flows uniformly, continuously and simultaneously into an entire continuously moving width of the blanket. The quantity of the mixture applied to the blanket is controlled by an adjustable wiper blade 49 that contacts the blanket.

The treated blanket passes between a pair of opposed rollers 92 which apply pressure to the treated blanket to form a uniform matrix therein. The rate of advance of the blanket is monitored and coordinated with the flow rate of the mixture into the blanket and the pressure applied thereto.

Simultaneously with the treatment of blanket 91, a continuous second blanket 93 is transferred to an adjacent temporary supporting surface shown in the drawings as arcuate blanket support 52 and positioned along the length thereof.

Thereafter, the free end of treated blanket 91 is grasped by end engaging means 62 mounted on transverse carrier 63. The carrier then is advanced along longitudinal track members 64 and 65 of the frame section 51 to the opposite end 55 thereof. During this advance, the blanket passes through support assembly 72 and under collapsed bladder material 94. The blanket 91 now in contact with continuous blanket 93 is cut at a point adjacent the entry end 54 of the arcuate support 52 with suitable cutting means (not shown). Since the matrix in the treated blanket is still in viscous liquid form, part of the matrix migrates downwardly into the continuous blanket.

At the same time, the end engaging means 62 mounted on transverse carrier 63 is returned to grasp the cut end of the treated blanket 91 and the carrier advanced along the frame section drawing the blanket over the previously deposited length of blanket. The deposit of additional lengths of blanket is continued until the preselected programmed specifications are achieved.

The length of bladder material 94 which has been positioned along the axis of the arcuate blanket support 52 is sealed at end 54 of the blanket support with a clamp 95. An air supply tube 96 is attached to free end 97 of the bladder and the bladder is inflated into contact with the stack of blankets.

The longitudinal edges of the blankets are wrapped around the bladder and overlapped. This is accomplished by pivoting of the spaced finger members 56 which are in contact with the blanket stack toward the inflated bladder.

As shown in FIGS. 4 and 5 of the drawings, each finger member 56 first is pivoted at its base toward the bladder. This movement causes the part of the blanket stack in contact therewith to move against the bladder. Since the finger members are interconnected, all of the finger members 56 spaced along the length of the one edge 58 of the arcuate blanket support 52 will simultaneously press the corresponding areas along the full length of the stack against the bladder.

Thereafter, the section of each finger member 56 spaced from the arcuate support adge 58 moves the entire longitudinal edge of the blanket stack against the bladder. Since the blankets are flexible and adhesive, they remain against the bladder while the finger members 57 on opposite edge 59 of the arcuate support 52 are activated and pivoted in two steps in the same manner as with the opposing finger members 56 described above. This action brings the second edge of the blanket stack into contact with and overlapping the first edge of the blanket stack as shown. The formation of the tubular structure now is completed.

The apparatus 11 is moved forward along the trench causing the completed tubular sturcture 98 to be separated from the arcuate blanket support 52 and the free end of the structure to drop into the trench 89 while still attached to the air supply. The attached end 99 of structure 98 remains in contact with the discharge end 55 of the arcuate blanket support.

The apparatus is stopped and the next section of tubular structure is fabricated repeating the steps performed in the fabrication of the first tubular section as described above with one addition. The end 99 of the completed structure in contact with the elongated arcuate support 52 is spaced above the end of the arcuate support with support assembly 71 to facilitate overlapping of the blanket stacks from one section to the next on the continuous blanket 93.

FIG. 6 illustrates schematically in perspective the overlap of a forward edge of a blanket stack with the trailing end 99 of a tubular structure 98 that has exited arcuate support 52. In FIG. 7, one longitudinal edge 101 of the blanket stack has been wrapped around the inflated bladder (not shown). FIG. 8 illustrates the second edge 102 of the blanket stack wrapped around the bladder and overlapped the first edge 101.

FIG. 9 illustrates schematically in greater detail the staggered arrangement of blankets in a stack. The blankets 103, 104 and 105 are offset both from side to side and forward and rearward of one another. The staggering and overlap of the blanket edges provides a tapered interconnection of the tubular sections as shown in FIG. 10. In this way, a novel continuous integral tubular structure with uniform high strength along its length is achieved according to the method of the present invention.

The specific strength of a tubular structure is dependent upon the type of fabric employed in the blankets, the particular treating material and the wall thickness. The wall thickness depends upon the number of fabric layers and the material with which they are treated. The diameter of the tubular structure is dependent upon the air bladder size, the size of the arcuate blanket support 52 and the distance between the opposed finger members 56 and 57.

The blankets in a stack may differ in type and construction as discussed above. In addition, the blankets in a stack may all be treated with a solidifiable liquid mixture or alternatively the stack may include one or more untreated blankets. If desired, a stack may include atlernating treated and untreated blankets. Since the matrix within a treated blanket normally is in a viscous liquid state when the blankets are stacked, a part of the matrix in a treated blanket may migrate into an adjoining untreated blanket prior to the solidification thereof.

Also, the liquid mixture applied to the blankets can be a different formulation from that applied to the other blankets. Advantageously, the innermost or top blanket includes a matrix different from that of underlying blankets. The matrix of the inner blanket preferably is flexible after the wrapped blankets are set in a final configuration and secured to a final surface. Most preferably, the inner blanket matrix has a significantly greater elongation than the matrix of underlying blankets.

The above description and the accompanying drawrings show that the present invention provides a novel apparatus, method and product with features and advantages not known previously. The continuous tubular structure is formed, placed and set easily and efficiently with a minimum of supervision and labor and without special equipment or procedures. The resulting structure is high in strength and low in cost.

The configuration and composition of the tubular structure can be modified along its length automatically to meet the requirements for spillways, headgates, changes in direction and the like. The structure has a long useful life without maintenance or repair. The structure is durable and resistant to damage from impact, frost, settling of the base and the like.

The base surface requires little, if any, preparation before the tubular structure is placed. The tubular structure can be placed at depressed temperatures not suitable for concrete placement.

The method of the invention permits a wide variety of different tubular structures to be produced. Changes from one design to another can be made easily and quickly.

It will be apparent that various modifications can be made in the particular apparatus, method and product described in detail above and shown in the drawings within the scope of the present invention. The arrangement of components, method steps and types of materials can be changed to meet specific requirements. Also, the tubular structure can be filled with a foam forming material, if desired. These and other changes can be made in the apparatus, method and product provided the functioning and operation thereof are not adversely affected. Therefore, the scope of the present invention is to be limited only by the following claims.

What is claimed is:

1. Mobile continuous tubular structure forming and placing apparatus including a support portion, a raw material supplying portion, a matrix forming portion, a tubular structure forming portion and a control portion; said support portion including a base section with wheeled carriage means depending therefrom; said raw material supplying portion including a plurality of reservoirs connected independently with said matrix forming portion through conduit means; said matrix forming portion including mixing and applying means; said tubular structure forming portion including a frame section, arcuate blanket support means associated with said frame section, blanket support means and aligned therewith, said blanket transporting means being movable from one end of said arcuate blanket support means to an opposite end thereof, a plurality of spaced movable finger members disposed along each longitudinal edge of said arcuate blanket support means, interconnecting means joining adjacent finger members; said control portion including blanket advancing means, finger moving means and coordinating means for said blanket advance, mixture delivery and finger movement in a preselected sequence to form a continuous tubular structure.

2. Mobile continuous structure forming and placing apparatus according to claim 1 wherein said arcuate blanket support means includes an elongated arcuate section.

3. Mobile continuous structure forming and placing apparatus according to claim 1 wherein said blanket transporting means includes end engaging means.

4. Mobile continuous structure forming and placing apparatus according to claim 1 wherein said blanket transporting means includes at least two spaced end engaging means mounted on transverse carrier means.

5. Mobile continuous structure forming and placing apparatus according to claim 4 wherein said transverse carrier means is supported between spaced parallel longitudinal track members of said frame section.

6. Mobile continuous structure forming and placing apparatus according to claim 1 wherein said movable finger members are pivotally connected to said arcuate blanket support means.

7. Mobile continuous structure forming and placing apparatus according to claim 1 wherein said movable finger members include sections pivotally connected along the length thereof.

8. Mobile continuous structure forming and placing apparatus according to claim 1 wherein said finger members are interconnected to provide simultaneous movement of all finger members disposed along one edge of said arcuate blanket support means.

9. Mobile continuous structure forming and placing apparatus according to claim 7 wherein said finger members along one edge of said arcuate blanket support means are interconnected to provide simultaneous movement of corresponding finger sections of adjacent finger members.

10. Mobile continuous structure forming and placing apparatus according to claim 1 wherein said matrix forming portion includes a table section disposed in a generally horizontal orientation during application of a solidifiable liquid mixture to a blanket moving thereover.

11. Mobile continuous structure forming and placing apparatus according to claim 10 wherein said table section includes major surfaces disposed at a slight angle to one another forming at least one shallow depression transverse to movement of said blanket thereover.

12. Mobile continuous structure forming and placing apparatus according to claim 1 wherein said tubular structure forming portion is orientable with respect to said base section.

13. Mobile continuous structure forming and placing apparatus according to claim 12 wherein said tubular structure forming portion is orientable to a position substantially parallel to said base section.

14. Mobile continuous structure forming and placing apparatus according to claim 1 wherein said matrix forming portion is orientable with respect to said base section.

15. Mobile continuous structure forming and placing apparatus according to claim 1 wherein said tubular structure forming portion is orientable with respect to said matrix forming portion.

16. Mobile continuous structure forming and placing apparatus according to claim 1 wherein said tubular structure forming portion includes envelope inflating means.

17. A method of continuously forming and placing an extended length of a tubular structure at a job site including the steps of providing a supply of a porous flexible blanket, providing a plurality of thermosetting resin forming raw material reservoirs, advancing each raw material independently to mixing means disposed closedly adjacent to mixture applying means, mixing said raw materials in preselected proportions, immediately continuously flowing uniformly a preselected quantity of a high viscosisty flowable thermosetting resin forming mixture simultaneously into an entire continuously moving width of said porous flexible blanket, applying pressure against said treated blanket to form a uniform matrix therein, monitoring the rate of advance of said blanket, coordinating said rate of advance with the flow rate of said mixture into said blanket and with the pressure applied thereto, transferring a continuous blanket to an adjacent temporary surface, positioning at least one length of treated blanket over said supported continuous blanket, positioning a substantially flat non-porous flexible envelope along the stacked blankets, introducing a pressurized gas into said envelope, inflating said envelope while in contact with said stacked blankets, wrapping said stacked blankets around said inflated envelope, disposing opposite longitudinal free edges of said blankets in an overlapping relationship, continuously positioning said inflated envelope/wrapped blanket combination along a preselected path while said combination is deformable and said matrix is adhesive, maintaining said non-porous envelope in an inflated state until said wrapped blankets are set in a final tubular configuration and bonded to a final supporting surface.

18. A method according to claim 17 wherein said supported continuous blanket is treated to form a matrix therein.

19. A method according to claim 17 wherein a top length of said stacked blankets includes a matrix with a composition different from that of underlying blankets.

20. A method according to claim 17 wherein said matrix of said top length of said stacked blankets is flexible after said wrapped blankets are set in a final configuration.

21. A method according to claim 17 wherein said matrix of said top blanket length has a significantly greater elongation than the matrix of underlying blankets.

22. A method according to claim 17 wherein a plurality of blanket lengths are positioned sequentially over said supported continuous blanket.

23. A method according to claim 22 wherein transverse edges of said stacked blankets are staggered in a predetermined arrangement and after being wrapped around said inflated envelope are in contact with corresponding transverse edges of preceding and succeeding wrapped blankets disposed along said supported continuous blanket.

24. A method according to claim 17 including simultaneously wrapping an entire longitudinal free edge of said blanket lengths in said overlapping relationship.

25. A method according to claim 17 wherein at least one length of an untreated blanket is positioned in contact with at least one treated blanket forming said stack of blankets.

26. A method according to claim 17 wherein alternating treated and untreated blankets form said stack of blankets.

27. A method according to claim 17 wherein a foam forming material is introduced into said envelope.

28. A tubular structure of extended length formed according to the method of claim 17.

29. A tubular structure of extended length formed according to the method of claim 18.

30. A tubular structure of extended length formed according to the method of claim 27.

* * * * *